(12) United States Patent
Tai et al.

(10) Patent No.: US 7,310,086 B2
(45) Date of Patent: Dec. 18, 2007

(54) FINGER NAVIGATION INPUT DEVICE

(75) Inventors: Li Chong Tai, Penang (MY); Ban Kuan Koay, Penang (MY); Wai Lee Wong, Penang (MY)

(73) Assignee: Avago Technologies ECBU IP (Singapore) PTE Ltd, Singapore (SG)

( * ) Notice: Subject to any disclaimer, the term of this patent is extended or adjusted under 35 U.S.C. 154(b) by 589 days.

(21) Appl. No.: 10/844,021

(22) Filed: May 12, 2004

(65) Prior Publication Data

US 2005/0253804 A1    Nov. 17, 2005

(51) Int. Cl.
*G09G 5/08* (2006.01)
(52) U.S. Cl. .................................. 345/158; 345/163
(58) Field of Classification Search ................ 345/156, 345/157, 159, 161, 162, 163, 164, 165, 166, 345/167, 168
See application file for complete search history.

(56) References Cited

U.S. PATENT DOCUMENTS

| | | | |
|---|---|---|---|
| 5,943,042 A * | 8/1999 | Siio | 345/172 |
| 6,466,198 B1 | 10/2002 | Feinstein | |
| 6,476,795 B1 * | 11/2002 | Derocher et al. | 345/163 |
| 6,714,188 B1 | 3/2004 | Zebuhr et al. | |
| 7,079,110 B2 * | 7/2006 | Ledbetter et al. | 345/156 |

* cited by examiner

*Primary Examiner*—Richard Hjerpe
*Assistant Examiner*—Jean Lesperance

(57) ABSTRACT

An input device includes a navigation mechanism configured to move parallel to a shaft and to move tangential to the shaft. The input device further includes a movement detection system to detect movement of the navigation mechanism relative to the shaft.

19 Claims, 4 Drawing Sheets

FINGER NAVIGATION INPUT DEVICE

BACKGROUND OF THE INVENTION

Input devices for computer systems continue to evolve. Occasionally, a useful device, such as the mouse, significantly changes the field of input devices. The mouse is particularly suited to desktop computer systems because it is moved across a flat surface to provide navigation input. For laptops, touch pads provide similar functionality, but are built into the system because of space concerns and to avoid the need for a flat surface on which to operate. In some cases, a mouse is attached to a laptop when the laptop is placed upon a desk or other flat surface, making the laptop much like a portable computer for desktop use.

It would be advantageous to develop an input device that is not reliant upon a desk or other flat surface to operate, but has the functionality of a mouse or a touch pad.

SUMMARY OF THE INVENTION

A finger navigation input device includes a navigation mechanism configured to move parallel to a shaft and to move tangential to the shaft. The device further includes a movement detection system to detect movement of the navigation mechanism relative to the shaft. The navigation mechanism may be a collar that is connected to the shaft. The device may further include an output port for transmitting signals that correspond to movement of the navigation mechanism relative to the shaft, a battery for powering the device, and a charging interface through which the battery is rechargeable.

A system designed for use with the finger navigation input device may include a computer responsive to the device. The system may further include a stowing bay for stowing the finger navigation input device, wherein the stowing bay includes a charging interface, compatible with the charging interface of the finger navigation input device, for recharging the battery of the finger navigation input device when stowed.

BRIEF DESCRIPTION OF THE DRAWINGS

Throughout the description, similar reference numbers may be used to identify similar elements.

DETAILED DESCRIPTION OF THE INVENTION

A technique for using a finger navigation input device involves using a finger to move a collar parallel to a shaft of the input device and using the same finger to rotate the collar tangential to the shaft. The technique does not rely upon a flat surface to operate, facilitates a natural posture (e.g., without twisting the wrist), and does not require the use of two hands. A device constructed to take advantage of this technique can be made to fit any hand size or preference (left or right). The device can be made wireless, rechargeable, energy-efficient, and compact. Since the device is compact, users can clip the device to their shirt pockets, attach the device to a keyboard or other peripheral device, or stow the device inside a portable computing device. If designed as described herein, the finger navigation input device can be practically any size, with one size limitation being the size of the battery.

Figure 1:
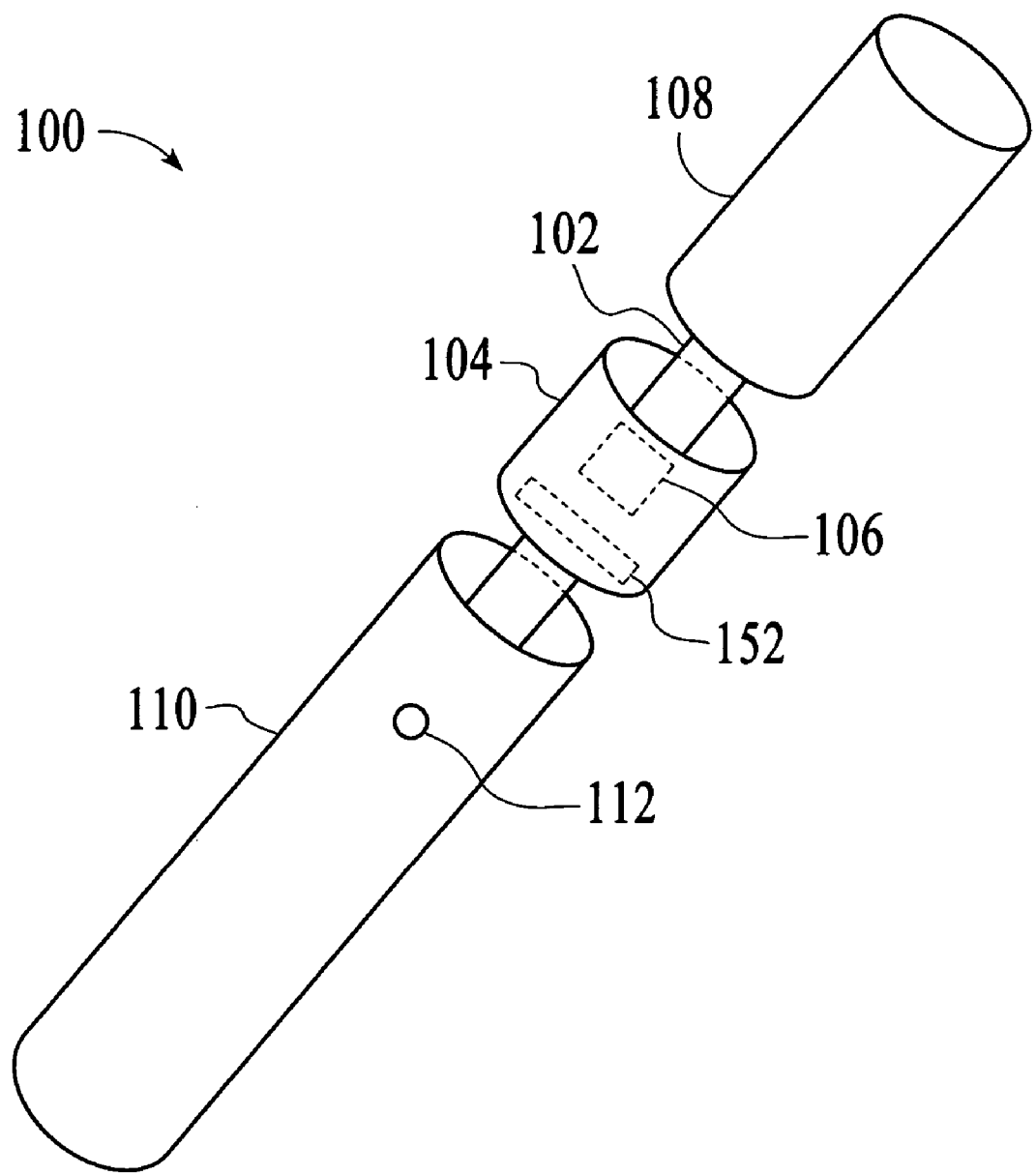
FIG. 1 depicts a finger navigation input device according to an embodiment of the invention.

FIG. 1 depicts a finger navigation input device 100 according to an embodiment of the invention. The finger navigation input device 100 includes a shaft 102, collar 104, a movement detection system 106, an upper shaft segment 108, a lower shaft segment 110, a button 112, and an output port 152. The shaft 102 may be constructed of any practicable material.

The collar 104 is connected to the shaft 102 in such a way that it moves parallel to the shaft 102 and tangential to the radius of the shaft 102. In an embodiment, the collar 104 slides along the shaft 102 and rotates around the shaft 102. For this reason, the movement of the collar 104 relative to the shaft 102 is restricted by the shaft 102. Moreover, the collar 104 fits around a portion of the shaft 102 that is smaller in diameter than the upper shaft segment 108 and the lower shaft segment 110. The upper shaft segment 108 and lower shaft segment 110 bound the collar 104 on respective upper and lower portions of the shaft 102 so that the upper shaft segment 108 and the lower shaft segment 110 further restrict the movement of the collar 104. The shaft 102 may be of any length up to the length of the finger navigation input device 100, but should be sufficiently long to facilitate movement of the collar 104 along the length of the shaft 102. The collar 104 may be connected to the shaft 102 in any practicable manner that allows the collar 104 to move relative to the shaft 120 as described.

The movement detection system 106 may be incorporated into the shaft 102, the collar 104, or any combination thereof. The movement detection system 106 detects movement of the collar 104 relative to the shaft 102. Some examples of appropriately connected and configured movement detection systems are described later with reference to FIGS. 2-4.

From a design standpoint, one advantage of the finger navigation input device 100 is the thin, long, compact design. Whereas in many other input device designs, such as a mouse, sizes of other components cause design limitations. For practical purposes, the size of a battery (not shown) used to power the finger navigation input device 100 is one of the few significant size limitations on the design of the finger navigation input device 100. For this reason, the finger navigation input device 100 can be made in a sleek, aesthetically pleasing design.

When using the finger navigation input device 100, a user slides the collar 104 up toward the upper shaft segment 108 or down toward the lower shaft segment 110 and rotates the collar 104 clockwise or counterclockwise tangential to the radius of the shaft 102. This movement relative to the shaft is detected by the movement detection system 106. Signals that correspond to the movement of the collar 104 relative to the shaft are transmitted via an output port (not shown) to, for example, a computer (not shown). This makes the computer responsive to the finger navigation input device 100. The signals can be used to navigate a computer display in a manner that is well-understood in the art of electronics. In an embodiment, the finger navigation input device 100 is wireless and relies upon a battery (not shown) for power.

The design of the finger navigation input device 100 enables users to hold the device in one hand and use a finger of the same hand to manipulate the collar 104. The button 112 gives the finger navigation input device 100 the functionality of a mouse. For example, the user could use the thumb of one hand to control the movement of the collar 104 and a finger of the same hand to operate the button 112. Because of the size and shape of the finger navigation input device 100, the device is stable without the use of a supporting structure, such as a desk, and without using the other hand, as is typical when using a joystick. This is superior to, for example, a joystick, at least because a joystick typically is supported with two hands or placed on a surface to improve control. Some mice, such as trackball mice, are finger navigation input devices because they require only one finger with which to navigate. However, these types of mice are unwieldy when held in one hand and manipulated using a finger on the same hand.

The output port 152 includes a wireless infrared signal transmitter. In alternatives, the output port 152 may include any type of electromagnetic transmitter, sonic transmitter, wire connection, or other transmitter or transmission means. The type of output port 152 incorporated into the finger navigation input device 100 is not critical. In an embodiment, the output port 152 is connected to the movement detection system 106. Accordingly, as depicted in the example of FIG. 1, the output port 152 is near the collar 104. However, the output port 152 may be connected to the finger navigation input device 100 at any point along the length of the device.

Figure 2:
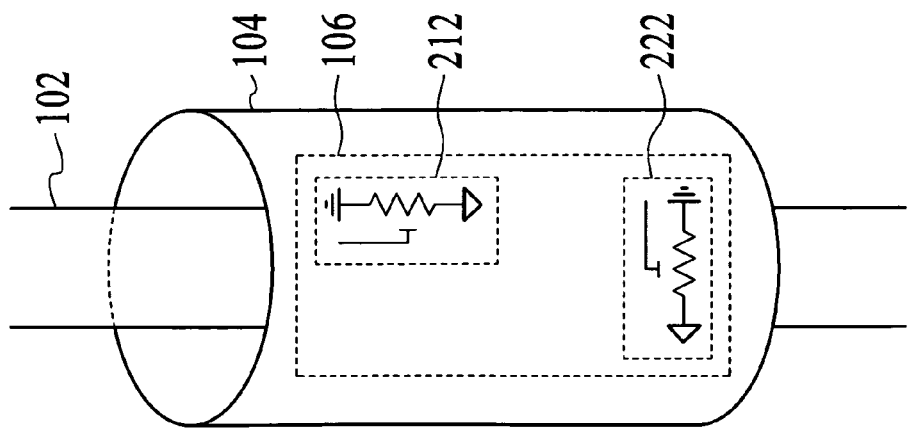

FIG. 2 depicts an exemplary movement detection system 106 for use with the finger navigation input device 100 (FIG. 1). In the example of FIG. 2, the movement detection system 106 includes a vertical potentiometer 212 and a horizontal potentiometer 214. In an embodiment, the vertical potentiometer 212 and the horizontal potentiometer 214 are integrated into the collar 104. The vertical potentiometer 212 detects movement of the collar 104 parallel to the shaft 102. The horizontal potentiometer 214 detects movement of the collar 104 tangential to the radius of the shaft 102. Potentiometers are well-known in the art of electronics so a detailed description is omitted. See *The Art of Electronics* by Horowitz and Hill (1989), incorporated herein in its entirety for reference, for a more detailed treatment of potentiometers. Since potentiometers consume relatively low amounts of power, the movement detection system 106 is energy efficient.

Figure 4:
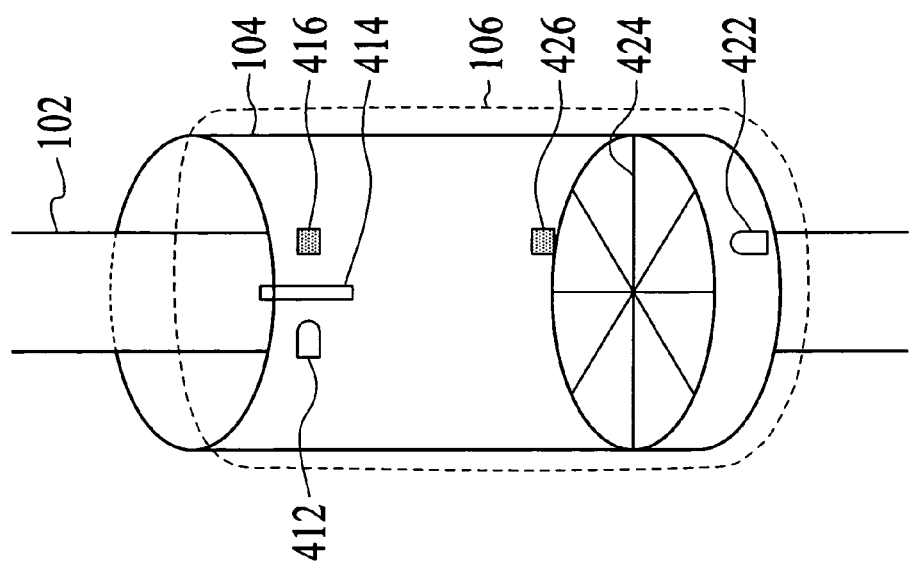
FIGS. 2, 3, and 4 depict exemplary movement detection systems for use with the finger navigation input device of FIG. 1.
Figure 3:
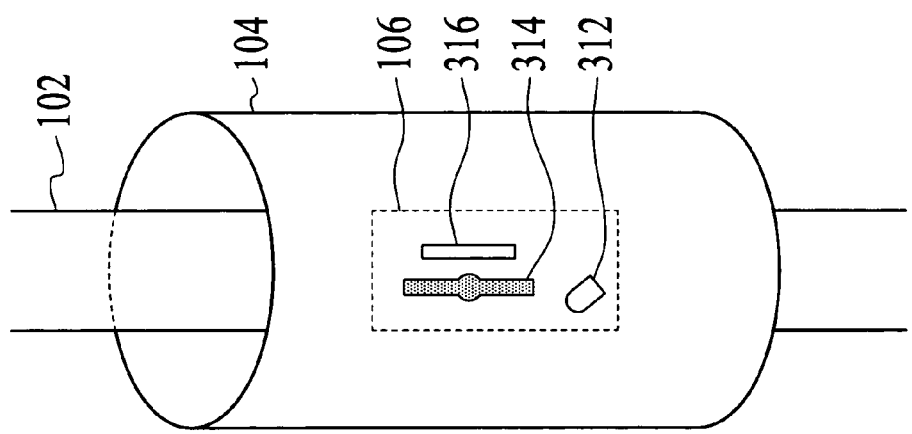

FIGS. 3 and 4 depict exemplary movement detection systems for use with the finger navigation input device 100 (FIG. 1). Since these devices are well-known in the art of electronics, only a brief description is provided herein.

In the example of FIG. 3, the movement detection system 106 includes a light source 312 for illuminating a surface of the shaft 102, an optical sensor 316 for detecting movement of the collar 104 relative to the illuminated surface of the shaft 102, and a lens 314 between the optical sensor 316 and the shaft 102 for magnifying the illuminated surface of the shaft 102 for the optical sensor 316. In an embodiment, the light source 312, lens 314, and optical sensor 316 are integrated into the collar 104. In operation, the light source 312 illuminates an area of the shaft 102 and the optical sensor 316 receives light reflected from the illuminated area through the lens 314. When the collar 104 moves, the optical sensor detects the movement. An optical mouse functions similarly, but the light source is directed onto a flat surface and the optical sensor detects movement of the optical mouse when moved across the flat surface.

In the example of FIG. 4, the movement detection system 106 includes a vertical encoder emitter 412, a vertical light block 414, and a vertical encoder receiver 416 for using light to determine the movement of the collar 104 parallel to the shaft 102. The movement detection system 106 (FIG. 4) further includes a horizontal encoder emitter 422, a horizontal light block 424, and a horizontal encoder receiver 426 for using light to determine the movement of the collar 104 tangential to the shaft 102. In an embodiment, the vertical encoder emitter 412, vertical light block 414, and vertical encoder receiver 416 are integrated into the collar 104. Similarly, in an embodiment, the horizontal encoder emitter 422, horizontal light block 424, and horizontal encoder receiver 426 are connected to the collar 104. In operation, the vertical encoder emitter 412 emits a signal, the vertical light block 414 blocks out vertical light, and the vertical encoder receiver 416 uses the light to determine the movement of the collar 104 parallel to the shaft 102. The horizontal components function similarly.

Figure 5:
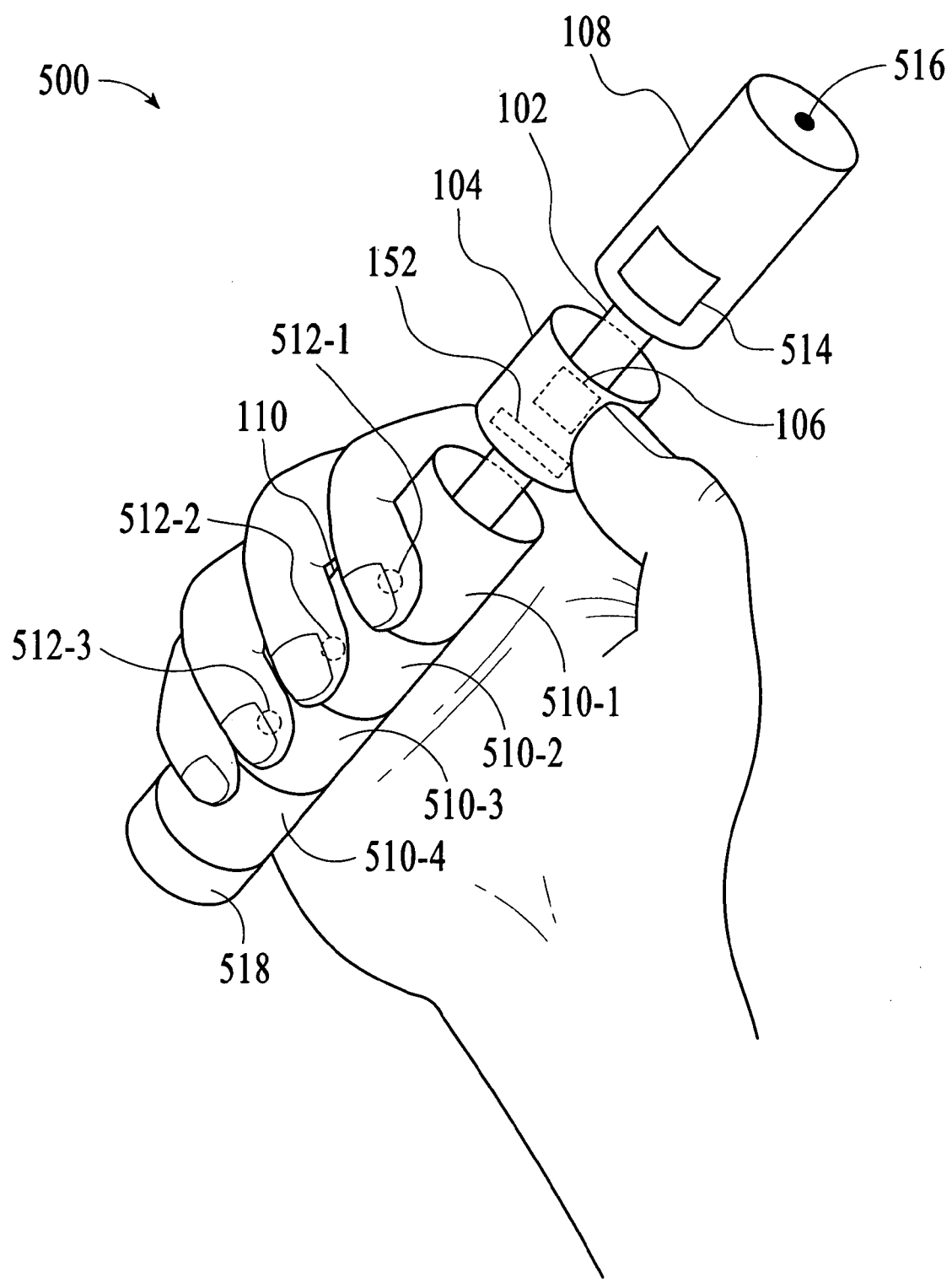
FIG. 5 depicts an alternative finger navigation input device according to an embodiment of the invention.

FIG. 5 depicts an alternative finger navigation input device 500 according to an embodiment of the invention. For the purposes of illustration only, FIG. 5 shows a hand holding the finger navigation input device 500. It should be noted that the hand is a right hand, but the finger navigation input device 500 can be used equally well with a left hand. The finger navigation input device 500 includes a shaft 102, collar 104, motion detection system 106, upper shaft segment 108, lower shaft segment 110, output port 152, buttons 512-1, 512-2, and 512-3 (referred to hereinafter as buttons 512), light emitting diode (LED) 514, laser pointer 516, and turning disk 518. Users manipulate the collar 104 in the same way described previously with reference to FIG. 1. The lower shaft segment 110 includes adjustable segments 510-1, 510-2, 510-3, and 510-4 (referred to hereinafter as adjustable segments 510). The buttons 512 are on some of the adjustable segments 510.

In an embodiment, the adjustable segments 510 are adjustable because they can be rotated tangential to the radius of the shaft 102. This allows users to adjust the finger navigation input device 500 to ergonomically fit into the users' hands and to make the buttons 512 on the adjustable segments more easily accessible to the users' fingers. Alternatively, users could extend and retract the adjustable segments 510 along the shaft 102 to ergonomically fit into the users' hands.

The function of the buttons 512 are similar to those of a mouse (e.g., the button 512-2 may be equivalent to a left mouse button and the button 512-3 may be equivalent to a right mouse button). Thus, users could press the button 512-2 and manipulate the collar 104 to highlight text much as a PC user can press a left mouse button and move a mouse to highlight text. In an embodiment, pressing two buttons at the same time (e.g., the button 512-1 and the button 512-2) and then manipulating the collar 104 provides functionality that is similar to the scroll wheel of a mouse.

In an embodiment, the LED 514 is on the upper shaft segment 108. When the movement detection system 106, detects movement of the collar 104, the LED 514 is activated. The color of the LED 514 may be different depending upon the type of movement detected (e.g., blue for clockwise movement, pink for counterclockwise movement, red for upward movement, and green for downward movement). The LED 514 is particularly suited to being placed anywhere on the finger navigation input device 500 (e.g., on the shaft 102, on the collar 104, etc.) Alternatively, the LED 514 could be split into multiple LEDs (not shown) located at various points on the finger navigation input device 500 (e.g., an LED on the upper shaft segment 108, which is activated when movement is detected in the upward direction). Or multiple LEDs could be arranged as a grid that shows the direction of detected movement.

The laser pointer 516 is on the end of the upper shaft segment 108. In an embodiment, the laser pointer 516 is activated by one of the buttons 512 (e.g., button 512-1). Since the finger navigation input device 500 is held and operated with one hand with relative ease, the laser pointer 516 can be used effectively as a presentation tool. Indeed, even while manipulating the collar 104, users may be able to accurately direct the laser pointer 516.

The turning disk 518 is connected to the end of the lower shaft segment 110. The turning disk 518 can be turned in a clockwise or counterclockwise direction. In an embodiment, the turning disk 518 has four settings (in a clockwise direction at 12 o'clock, 3 o'clock, 6 o'clock, and 9 o'clock). The four settings correspond to four modes of operation: normal, power-saving, programming, and off. In programming mode, users can program the functionality of the buttons 512. The other modes of operation are self-explanatory. In alternatives, the turning disk 518 could have more or less positions that initiate other functionality.

In an embodiment, when the finger navigation input device 500 is not in use, it can be closed. To close the finger navigation input device 500, users press the upper shaft segment 108 toward the lower shaft segment 110. The upper shaft segment 108 and lower shaft segment 110 close towards one another until reaching the collar 104, at which point movement of the collar 104 in the vertical direction is restricted. The closed finger navigation input device 500 may be stowed within a stowing bay, as described with reference to FIG. 6.

Figure 6:
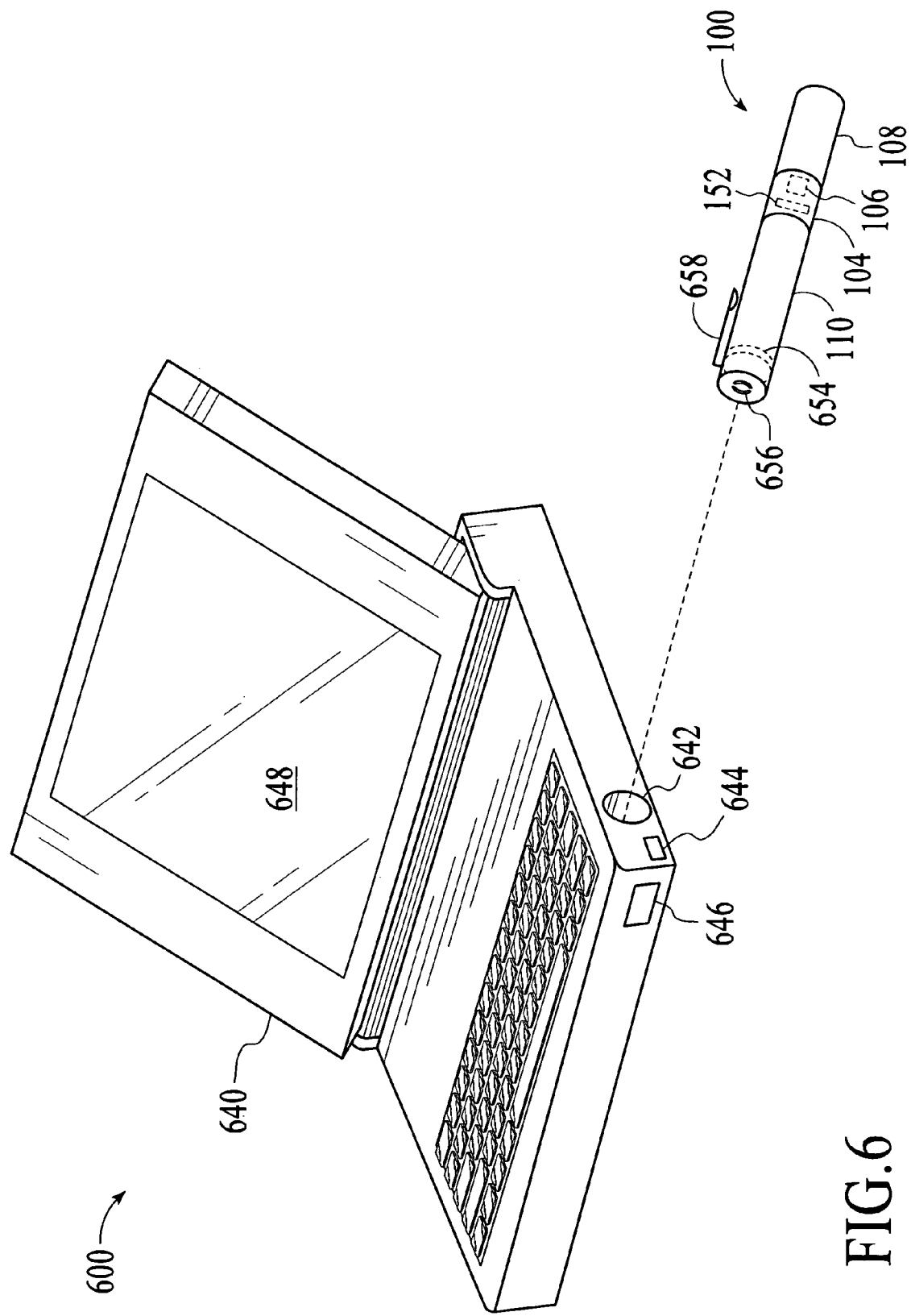
FIG. 6 depicts a portable computer system and finger navigation input device according to an embodiment of the invention.

FIG. 6 depicts a portable computer system 600 according to an embodiment of the invention. The system 600 includes a finger navigation input device 100 and a laptop computer 640. The finger navigation input device 100 includes a collar 104, a movement detection system 106, an upper shaft segment 108, a lower shaft segment 110, an output port 152, a battery 654, a charging interface 656, and an optional clip 658. The laptop computer 640 includes a stowing bay 642, an eject button 644, a receiver 646, and a display 648. The finger navigation input device 100 is, for illustrative purposes only, in a closed configuration. In other words, the upper shaft segment 108 and lower shaft segment 110 have been pressed towards one another until reaching the collar 104. In an embodiment, the finger navigation input device 100 is closed prior to stowing in the stowing bay 642.

The laptop 640 receives signals from the output port 152 through the receiver 646. In an embodiment, a cursor on the display 648 moves in accordance with the signals.

In an embodiment, the battery 654 is rechargeable. The battery 654 is recharged through the charging interface 656, which is connected to the lower shaft segment 110, when the finger navigation input device 100 is stowed. It follows that the stowing bay 642 of the laptop computer 640 has a charging interface (not shown) compatible with the charging interface 656, for recharging the battery 656 when the finger navigation input device 100 is stowed in the stowing bay 642. It should be noted that in an alternative, the stowing bay 642 and the eject button 644 are external to the laptop computer 640. In this alternative, the stowing bay 642 could function as an attachment to the laptop 640 or as a standalone unit for charging a presentation device (e.g., the finger navigation input device 100).

The clip 658 has the dual purpose of enabling users to clip the finger navigation input device 100 to objects (e.g., a shirt pocket) and to help guide the device along a groove (not shown) into the stowage bay 642. A stowed finger navigation input device 100 can be ejected by pressing the eject button 644 on the laptop 640.

While stowed, the finger navigation input device 100 may be programmable with software, much as a mouse is often programmable with software.

It should be noted that although a portable computer system 600 is described, a non-portable system could be used. Similarly, a desktop computer or some other computing device could be used instead of the laptop 640.

The term collar, as used herein, refers to any type of navigation mechanism. Navigation mechanisms may include a moveable button, a semi-circle that does not wrap entirely around the shaft of the finger navigation input device 100, or other mechanisms that are easily manipulable with the finger of one hand.

The term finger, as used herein, includes the thumb.

The term output port, as used herein, includes any transmission means that may be used to transmit a signal from the finger navigation device to a computing device. The output port may include a wireless infrared transmitter. Alternatively, the output port may include a wired connection. The computing device is assumed to have a compatible receiver for the output port of the finger navigation device.

The term laptop, as used herein, refers to any portable computing device that is responsive to the finger navigation input device 100.

Although specific embodiments of the invention have been described and illustrated, the invention is not to be limited to the specific forms or arrangements of parts as described and illustrated herein. The invention is limited only by the claims.

What is claimed is:

1. A finger navigation input device, comprising:
   a shaft;
   a navigation mechanism configured to move parallel to the shaft and to move tangential to the shaft; and
   a movement detection system configured to detect movement of the navigation mechanism relative to the shaft;
   wherein said navigation mechanism is a collar that completely encircles the shaft;
   wherein, in operation, the device is held in one hand, wherein the collar is manipulable with a finger of the hand, and wherein the device is stable without the use of a supporting surface and without the use of another hand.

2. The device of claim 1 wherein said navigation mechanism is configured to slide along the shaft.

3. The device of claim 1 wherein said navigation mechanism is configured to rotate around the shaft.

4. The device of claim 1 further including an output port configured to transmit signals associated with the detected movement of the navigation mechanism relative to the shaft.

5. The device of claim 1 further comprising:
   an upper shaft segment configured to move parallel to the shaft; and
   a lower shaft segment configured to move parallel to the shaft, wherein the navigation mechanism is connected to the shaft between the upper shaft segment and the lower shaft segment, and wherein when the upper shaft segment and the lower shaft segment are moved next to the navigation mechanism, the movement of the navigation mechanism parallel to the shaft is restricted.

6. The device of claim 1, further comprising a Light Emitting Diode (LED) that emits light according to the movement of the navigation mechanism.

7. The device of claim 1 wherein the shaft includes multiple shaft segments, wherein multiple shaft segments are adjustable to ergonomically fit into a hand.

8. The device of claim 1 wherein the shaft includes multiple shaft segments, wherein one or more of the shaft segments include respective buttons, and wherein the device further comprises a turning disk for setting the programming of said respective buttons.

9. The device of claim 8 wherein said one or more shaft segments are adjustable to configure placement of the respective buttons to ergonomically fit into a hand.

10. The device of claim 1 further comprising:
a button; and
an output port configured to transmit signals associated with operation of the button.

11. The device of claim 1 further comprising a turning disk for setting functionality.

12. The device of claim 1 further comprising a retractable shaft segment, wherein when the retractable shaft segment is retracted, the retractable shaft segment restricts the movement of the navigation mechanism parallel to the shaft.

13. A finger navigation input device, comprising:
a shaft;
a collar, connected to the shaft, configured to move parallel to the shaft and rotate tangential to the radius of the shaft, wherein movement of the collar relative to the shaft is restricted by the shaft; and
a movement detection system configured to detect movement of the navigation mechanism relative to the shaft;
wherein the shaft has upper and lower portions with larger diameters than a central portion, wherein the collar fits around the central portion, and wherein movement parallel to the shaft is restricted by the upper and lower portions.

14. A portable computer system comprising:
an input device, including:
  a shaft;
  a navigation mechanism configured to move relative to the shaft and to move tangential to the shaft;
  a movement detection system configured to detect movement of the navigation mechanism relative to the shaft;
  an output port for transmitting signals that correspond to movement of the navigation mechanism relative to the shaft;
  a battery for powering the input device; and
  a charging interface through which the battery is rechargeable;
a computing device responsive to the input device, wherein the computing device includes a receiver configured to receive signals from the input device;
a stowing bay for stowing the input device, wherein said stowing bay includes a charging interface, compatible with the charging interface of the input device, for recharging the battery of the input device when the input device is stowed in the stowing bay; and
a clip having a dual purpose of facilitating clipping the input device to an object and facilitating guiding the input device into a storage bay of the portable computer system.

15. A finger navigation input device, comprising:
a shaft;
a navigation mechanism configured to move parallel to the shaft and to move tangential to the shaft;
a movement detection system configured to detect movement of the navigation mechanism relative to the shaft;
wherein said shaft includes:
an upper shaft segment;
a laser pointer connected to the upper shaft segment;
a lower shaft segment; and
a button, connected to the lower shaft segment, for activating the laser pointer.

16. A finger navigation input device, comprising:
a shaft;
a navigation mechanism configured to move parallel to the shaft and to move tangential to the shaft;
a movement detection system configured to detect movement of the navigation mechanism relative to the shaft;
an upper shaft segment configured to move parallel to the shaft; and
a lower shaft segment configured to move parallel to the shaft, wherein the navigation mechanism is connected to the shaft between the upper shaft segment and the lower shaft segment, and wherein when the upper shaft segment and the lower shaft segment are moved next to the navigation mechanism, the movement of the navigation mechanism parallel to the shaft is restricted.

17. A finger navigation input device, comprising:
a shaft;
a navigation mechanism configured to move parallel to the shaft and to move tangential to the shaft; and
a movement detection system configured to detect movement of the navigation mechanism relative to the shaft;
wherein the shaft includes multiple shaft segments, wherein multiple shaft segments are adjustable to ergonomically fit into a hand.

18. A finger navigation input device, comprising:
a shaft;
a navigation mechanism configured to move parallel to the shaft and to move tangential to the shaft; and
a movement detection system configured to detect movement of the navigation mechanism relative to the shaft;
wherein the shaft includes multiple shaft segments, wherein one or more of the shaft segments include respective buttons, and wherein the device further comprises a turning disk for setting the programming of said respective buttons.

19. A finger navigation input device, comprising:
a shaft;
a navigation mechanism configured to move parallel to the shaft and to move tangential to the shaft;
a movement detection system configured to detect movement of the navigation mechanism relative to the shaft; and
a turning disk for setting functionality, wherein the turning disk has a plurality of settings with each setting corresponding to a different mode of operation, wherein the turning disk has a plurality of settings with each setting corresponding to a different mode of operation.

* * * * *

UNITED STATES PATENT AND TRADEMARK OFFICE
CERTIFICATE OF CORRECTION

| | | |
|---|---|---|
| PATENT NO. | : 7,310,086 B2 | |
| APPLICATION NO. | : 10/844021 | |
| DATED | : December 18, 2007 | |
| INVENTOR(S) | : Li Chong Tai et al. | |

It is certified that error appears in the above-identified patent and that said Letters Patent is hereby corrected as shown below:

Column 8, Line 57-60, Claim 19, after "operation" delete ", wherein the turning disk has a plurality of settings with each setting corresponding to a different mode of operation".

Signed and Sealed this
Twenty-sixth Day of June, 2012

David J. Kappos
*Director of the United States Patent and Trademark Office*